March 20, 1928.

O. E. BUCKLEY 1,662,956

TELEGRAPH CONDUCTOR

Filed Dec. 30, 1921

Inventor:
Oliver E. Buckley
by *[signature]*
Att'y.

Patented Mar. 20, 1928.

1,662,956

UNITED STATES PATENT OFFICE.

OLIVER E. BUCKLEY, OF MAPLEWOOD, NEW JERSEY, ASSIGNOR TO WESTERN ELECTRIC COMPANY, INCORPORATED, OF NEW YORK, N. Y., A CORPORATION OF NEW YORK.

TELEGRAPH CONDUCTOR.

Application filed December 30, 1921. Serial No. 525,994.

This invention relates to duplex telegraph systems and particularly to submarine cables for use in such systems.

An object of the invention is to provide a new and improved type of telegraph conductor, which is not susceptible to variations of temperature, whereby the balance of a duplex system is maintained more accurate than when the usual type of conductor is employed.

This invention is described as applied to submarine cable telegraphy.

In a duplex system, the speed of signaling is limited to the value at which the received signals are of sufficient amplitude to permit reading through the interference produced in the receiving apparatus by transmitted signals. If by any means the magnitude of the interference current can be reduced, the speed of signaling can be increased until the limit of legibility is again reached.

The condition of ideal operation of a duplex system is that at every instant, the cable and the balancing artificial line shall have the same impedance as measured from their respective terminals to ground. Since the submarine cable is constituted of sections, each of which, from various causes, has a characteristic impedance which varies more or less from the average characteristic impedance of the cable; it is necessary to reproduce these irregularities in the artificial line as closely as possible. Failure to do so results in the production in the receiving apparatus of interference currents due to the transmitted signals, and the contribution of any particular section of the cable to this interference current is proportional to the difference between the characteristic impedance of that cable section and that of the corresponding section of artificial line. The interference current produced by a particular section also falls off rapidly as the distance of the section from the cable terminal is increased; and it is, therefore, of the utmost importance to balance the irregularities which are located close to the terminal of the cable.

Two factors tending to cause fluctuations in the electrical charactertistics of the cable are, first, a change in the electrical resistance of the signaling conductor with change of temperature; and second, the change in the electrical capacity of the cable with change in temperature, this change of temperature being due to temperature changes of the water in which the cable is submerged.

In the temperature range encountered in cable practice, the conductor resistance and the cable capacity may be computed from the formulæ:

$$R = R_0(1+\alpha_1 t), \quad C = C_0(1-\alpha_2 t),$$

where $R_0$ and $C_0$ are the values of resistance and capacity at zero degrees centigrade, and $R$ and $C$ the resistance and capacity at $t$ degrees centigrade. $\alpha_1$ and $\alpha_2$ are constants which depend only upon the materials used in the conductor and in the insulating layer. The characteristic impedance at the frequency $p/2\pi$ may then be computed from the formula:

$$Z = \sqrt{\frac{R}{jpC}} = \sqrt{\frac{R_0}{jpC_0}} \sqrt{\frac{1+\alpha_1 t}{1-\alpha_2 t}},$$

or, since $\alpha_1 t$ and $\alpha_2 t$ are small compared with unity we may expand the quantity under the last radical and write:

$$Z = Z_0 \left(1 + \frac{\alpha_1 + \alpha_2}{2} t\right),$$

where $$Z_0 \sqrt{\frac{R_0}{jpC_0}}$$

is the value of the characteristic impedance at zero degrees centigrade.

For a particular specimen of gutta percha $\alpha_2$ was found to have the value $6.5 \times 10^{-4}$. The value of $\alpha_1$ for copper is $42.8 \times 10^{-4}$. The quantity $$\frac{\alpha_1 + \alpha_2}{2},$$

which may be termed the temperature coefficient of characteristic impedance, is, therefore, largely determined by the temperature coefficient of resistance of the copper conductor; and so long as copper is used as the material of the conductor, this quantity will, as shown by the above values, be at least as great as $2 \times 10^{-3}$ per degree centigrade.

Although a good balance may be secured between the artificial line and the cable under certain weather and tide conditions, the balance is destroyed with change in temperature of the water due to a change in these conditions. As the water becomes warmer, the section of cable involved exhibits a higher impedance, and when the water subsequently cools the impedance then decreases. Moreover, the greatest temperature variations are located close to the cable terminals; and are, therefore, as previously indicated, very effective in disturbing the duplex balance. To eliminate interference of this sort would require continual variation of the artificial line, and consequently the duplex balance in general is much worse than if the irregularities do not vary with the time.

It has been found that if the conductor of the cable be made either wholly or in part of a material which has a smaller temperature coefficient of resistance than copper, variations in impedance of the cable may be considerably reduced. As examples of materials which may be used in this connection, the following compositions are given:

1. Copper, 88%; manganese, 10%; nickel, 2%.
2. Copper, 84%; manganese, 12%; nickel, 4%.
3. Copper, 80.5%; manganese, 3%; nickel, 16.5%.
4. Copper, 79.5%; manganese, 19.7%; iron, 0.8%.

These compositions are desirable for use as they have temperature coefficients of resistance which are negligible compared to the temperature coefficient of gutta percha. By replacing the copper conductor with any of these materials, the quantity $\frac{\alpha_1 + \alpha_2}{2}$ may be reduced from $24.7 \times 10^{-4}$ to about $3.3 \times 10^{-4}$; that is, the variations in the cable impedance due to temperature changes are reduced about 85%. The resulting duplex disturbance is accordingly reduced in the same proportion.

The invention, however, is by no means limited to the employment of the compositions above noted; but includes other electrical conducting materials having a lower temperature coefficient of resistance than copper. It would be highly desirable, for reasons which will be made clear presently, to employ a material which has as small a specific resistance as can be obtained consistently with having a sufficiently low temperature coefficient of resistance.

Any material of low temperature coefficient of resistance will probably have a specific resistance higher than that of copper. Consequently a conductor of the proposed type would have a larger cross-sectional area than a copper conductor of the same resistance per unit length. In view of the much greater cost of constructing such a cable, particularly on account of the larger quantity of dielectric required, it would, in general, be desirable to utilize a copper conductor wherever the temperature of the cable is constant, and to employ a core having a low temperature coefficient of characteristic impedance, wherever the temperature of the cable is liable to fluctuate. The temperature changes which are most violent and most effective in producing duplex unbalance are to be found near the terminals of the submarine cable; and, therefore, the part of the cable at the shore ends might advantageously be made of a core of the type which has been proposed.

In the construction of such a cable it is desirable that the characteristic impedance of the cable be uniform throughout its length in order that the reflection losses may be reduced to a minimum. Uniformity of ohmic resistance per unit length throughout the conductor is not essential.

Referring to the drawings:

Two cable cores whose shore ends are made in accordance with this invention, are shown in longitudinal cross-section.

Fig. 1 shows portions of the shore and the deep sea sections of a cable core whose conductor diameter is so selected that the characteristic impedance of the cable and the diameter over the gutta-percha insulation are uniform throughout.

Since the latter condition may call for a thickness of gutta percha which is insufficient for mechanical reasons, it is often desirable to increase the diameter of the core.

Figure 1:
Figure 3:
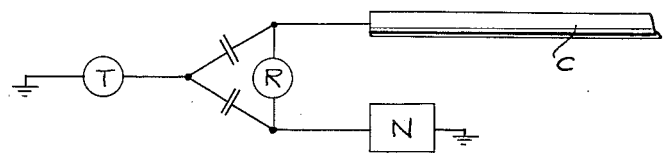
Fig. 3 is a diagrammatic showing of the usual duplex bridge terminal circuit arrangement in general use in submarine signaling systems comprising the cable C, which in this case is of the improved type herein described, a receiving apparatus R, the transmitting apparatus T and the balancing network N.
Figure 2:
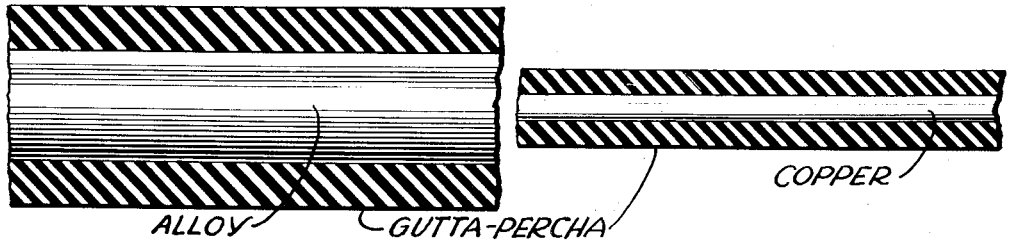
Fig. 2 shows portions of a cable core in which the diameter of the shore end has been increased so that the thickness of gutta percha meets the requirements of modern cable practice; while at the same time the amounts of alloy and gutta percha are so proportioned that the characteristic impedance is constant throughout the cable.

As has been shown by the above formulæ, the temperature coefficient of characteristic impedance of a cable may be reduced by the use of a conducting material of small temperature coefficient, until the temperature coefficient of characteristic impedance becomes equal to one-half the temperature coefficient of capacity of the dielectric. Duplex operation may be further improved by employing a dielectric which possesses a smaller temperature coefficient of capacity than the variety of gutta percha which was made the basis of the foregoing calculations.

The invention claimed is:

1. A submarine cable composed of a plurality of sections at least one of these sections having a temperature coefficient of impedance less than 2x10⁻³ per degree centigrade, and which comprises a conductor having a temperature coefficient of resistance lower than copper.

2. A telegraph cable composed of a plurality of sections at least one of which comprises a dielectric and a metallic conductor and has a temperature coefficient of impedance of less than 2x10⁻³ per degree centigrade.

3. A submarine cable conductor composed of a plurality of sections, at least one of the sections being composed of copper and at least one other being composed of an alloy having a temperature coefficient of resistance lower than copper.

4. A high speed submarine cable system comprising a signaling cable submerged in water, a terminal circuit including a network for balancing said cable, a section of signaling conductor of a material having a lower temperature coefficient of resistance than copper in a portion of said cable in water which has large temperature changes which portion requires careful balancing, and a section of copper signaling conductor connected to said first mentioned section and located in water of more even temperature.

5. A submarine cable comprising sections having conductors of materials of different temperature coefficients of resistance and having characteristic impedances substantially identical.

6. A submarine cable having in the deep water portion a conductor having at least the conductivity of copper and in the shallow water portion a conductor of low temperature coefficient of resistance.

7. A submarine cable section having a conductor of lower temperature coefficient of resistance than copper in combination with a cooperating section having a conductor of conductivity at least equal to copper, said sections being insulated to have the same characteristic impedance under working conditions.

In witness whereof, I hereunto subscribe my name this 29th day of December, A. D. 1921.

OLIVER E. BUCKLEY.